United States Patent Office 3,574,228
Patented Apr. 6, 1971

3,574,228
2-ARYL OXAZOLES
Kevan Brown, Woodley, England, assignor to John Wyeth & Brothers Limited
No Drawing. Filed June 12, 1968, Ser. No. 736,262
Claims priority, application Great Britain, June 14, 1967, 27,382/67
Int. Cl. C07d 85/44
U.S. Cl. 260—307                    3 Claims

ABSTRACT OF THE DISCLOSURE

It has been found that a small group of 2-aryl oxazoles, namely, 2,5-diphenyloxazol-4-ylacetic acid, 2-(p-chlorophenyl)-oxazol-4-ylacetamide, 2-(p-chlorophenyl)oxazol-4-ylacetic acid, and 2,4-diphenyloxazol-5-ylacetic acid, have antiinflammatory action as shown by standard pharmacological tests on laboratory animals, and are therefore of value in experimental pharmacology and therapy for the control, prevention, and relief of inflammation.

This invention relates to a novel group of oxazoles and provides processes for the preparation thereof.

My co-pending application Ser. No. 680,990, filed Nov. 6, 1967 provides novel oxazoles substituted by an aliphatic acid or a derivative thereof in the 2-position and by a substituted or unsubstituted aryl group in at least one of the 4- and 5-positions.

I have now found that certain 2-aryl oxazoles, namely, 2,5-diphenyloxazol-4-ylacetic acid,

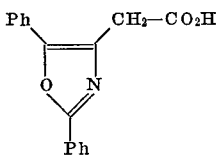

2-(p-chlorophenyl)oxazol-4-ylacetamide,

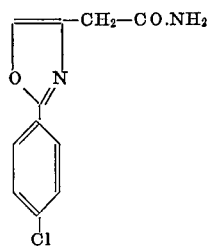

2-(p-chlorophenyl)oxazol-4-ylacetic acid,

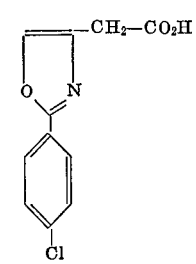

and 2,4-diphenyloxazol-5-ylacetic acid

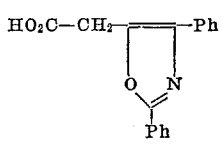

are shown by the rat paw oedema test to be effective as antiinflammatory agents. Such activity may be tested for and demonstrated by the procedures described by Winter et al., Proc. Soc. Exp. Biol. & Med., 111, 554 (1962), and by Buttle et al., Nature, 179, 629 (1957).

Accordingly, the compounds of this invention are useful in experimental pharmacology, research, and therapy in the control, prevention, and relief of inflammation in animals.

The compounds of this invention may be made by synthetic methods well known in the oxazole field. The examples given below are illustrative of methods which are suitable, but others may be employed also.

EXAMPLE 1

2,5-diphenyloxazol-4-ylacetic acid 4-chloromethyl-2,5-diphenyloxazole was prepared by the method of K. Bodendorf and H. Towliate, Arch. Pharm. 298 (1965) page 293. This chloromethyl compound (14 g.) was heated with potassium cyanide (7 g.) in refluxing ethanol (80 ml.) and water (10 ml.) for 5 hours before being filtered while hot. After removing some of the ethanol water was added and the crystalline solid filtered. Recrystallization from ethanol gave 9.8 g. of needle crystals. Yield 72%, M.P. 137–8°C.

This nitrile (9 g.) was heated in refluxing 6N HCl for 90 minutes. On cooling, crystals separated and were extracted into ether. The ether layer was washed with water, dried (MgSO$_4$) and evaporated to give 8.4 g. of crystalline solid. Recrystallization from benzene gave 4.2 g. of white needle crystals. A second crop (2.9 g.) was obtained, and recrystallized from benzene/petroleum ether (80–100°C.) Yield 74%, M.P. 177–8°C.

Analysis.—Found C, 73.5; H, 4.7; N, 4.7. $C_{17}H_{13}NO_3$ requires C, 73.2; H, 4.7; N, 5.0%.

In the rat paw oedema test, this compound gave 55% inhibition of carrageenin-induced swelling when administered orally in a dose of 100 mg./kg.

EXAMPLE 2

2-(p-chlorophenyl)oxazol-4-ylacetamide (a) A mixture of p-chlorobenzamide (15.6 g.), sym-dichloroacetone (12.7 g.) and calcium carbonate (5.0 g.) in dimethylformamide (20 ml.) was heated at 130–140° C. on an oil bath for 4½ hours. The crude mixture was poured into water and the resulting solid was filtered. The solid was dissolved in chloroform and the solution was washed well with water, dried and evaporated. The black solid obtained was chromatographed on silica, and eluted with a 1:1 petrol (60–80°) benzene to give 2-(p-chlorophenyl)-4-chloromethyloxazole as a white crystalline solid (4.7 g., 21%), M.P. 97–8° C.

(b) Potassium cyanide (5 g.) in water (20 ml.) was added to a solution in ethanol of the product obtained in Example 4(a). The solution was boiled under reflux for 4 hours, evaporated, and then water was added to the residue. The solid obtained was filtered, washed well with water and dried. It was then dissolved in ethanol, treated with charcoal, and water was added to give 2-(p-chlorophenyl)-4-cyanomethyl oxazole (5.7 g., 60%) as a white crystalline solid, M.P. 117.5–118.5° C.

2-(p-chlorophenyl)-4-cyanomethyloxazole (2.2 g.) was dissolved in cold concentrated hydrochloric acid (25 ml.) and the solution was stirred at room temperature for 2 hours before being poured onto ice/water. The white solid (2.2 g.) was filtered and recrystallized from aqueous ethanol to give the title compound as white needles (1.4 g., 58%), M.P. 192–193° C.

Analysis.—Found: C, 55.7; H, 3.9; Cl, 14.8; N, 11.8. $C_{11}H_9ClN_2O_2$ requires C, 55.8; H, 3.8; Cl, 14.9; N, 11.8%.

In the rat paw oedema test, this compound gave 21% inhibition of carrageenin-induced swelling when administered orally in a dose of 100 mg./kg.

EXAMPLE 3

2-(p-chlorophenyl)oxazol-4-ylacetic acid 2-(p-chlorophenyl)-4-cyanomethyloxazole (1.2 g.) obtained as described in Example 4 (b) was dissolved in ethanol (13 ml.) and a solution of sodium hydroxide (4 g.) in water (5 ml.) was added. The reaction mixture was boiled under reflux for 4 hours, the ethanol was removed, and the resulting solution was acidified with hydrochloric acid. The solid formed was filtered, dried, and recrystallized from benzene to give the title compound as white needles (0.86 g., 66%), M.P. 174–175° C.

*Analysis.*—Found: C, 55.6; H, 3.4; N, 6.1. $C_{11}H_8ClNO_3$ requires C, 55.7; H, 3.4; N, 5.9%.

EXAMPLE 4

2,4-diphenyloxazol-5-ylacetic acid

Benzamide (3.02 g.) was added to a suspension of sodium hydride (1.2 g., 50% in oil) in benzene (200 ml.) and the mixture heated and stirred under reflux for ½ hour. Ethyl 4-bromo-4-phenylacetoacetate (7.14 g.) in benzene (30 ml.) was then added dropwise over 0.5 hr. and heating continued for a further 1½ hours. Water was added and the benzene layer washed with water, sat. NaCl, dried (MgSO₄) and evaporated to give a brown solid (6.6 g.). This was dissolved in concentrated sulphuric acid (25 ml.) and the solution left at room temperature for 18 hours. The solution was poured into excess water and ether added. The ether layer was washed with sat. NaHCO₃, water, dried (MgSO₄) and evaporated to give the crude ester of the title compound (1.2 g.). The crude ester (1.2 g.) was dissolved in ethanol (20 ml.) and potassium hydroxide (1 g.) in water (5 ml.) added. The solution was warmed on a steam bath for 5 minutes and left at room temperature for 2 hours. The solution was evaporated to give an oil, water and ether were added to the oil and the aqueous layer treated with charcoal, filtered and acidified to give 2,4-diphenyloxazol-5-ylacetic acid, the structure of which was confirmed by its I-R spectrum.

What is claimed is:

1. A compound of the group consisting of 2,5-diphenyloxazol-4-ylacetic acid and 2,4-diphenyloxazol-5-ylacetic acid.

2. A compound according to claim 1 which is 2,5-diphenyloxazol-4-ylacetic acid.

3. A compound according to claim 1 which is 2,4-diphenyloxazol-5-ylacetic acid.

References Cited

UNITED STATES PATENTS 3,470,195   9/1969   O'Mant _____ 260—307

ALEX MAZEL, Primary Examiner

R. V. RUSH, Assistant Examiner

U.S. Cl. X.R.

260—999